United States Patent
Yamazaki

(10) Patent No.: US 10,408,148 B2
(45) Date of Patent: Sep. 10, 2019

(54) SUPERCHARGED ENGINE CONTROL SYSTEM

(71) Applicant: TOYOTA JIDOSHA KABUSHIKI KAISHA, Toyota-shi (JP)

(72) Inventor: Tomohiro Yamazaki, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 124 days.

(21) Appl. No.: 15/454,360

(22) Filed: Mar. 9, 2017

(65) Prior Publication Data
US 2017/0268443 A1    Sep. 21, 2017

(30) Foreign Application Priority Data

Mar. 15, 2016  (JP) ................. 2016-051104

(51) Int. Cl.
*F02D 23/00*     (2006.01)
*F02D 41/02*     (2006.01)
(Continued)

(52) U.S. Cl.
CPC ............. *F02D 41/029* (2013.01); *F01N 9/00* (2013.01); *F01N 13/008* (2013.01);
(Continued)

(58) Field of Classification Search
CPC .... F02D 41/029; F02D 23/02; F02D 41/0007; F02D 41/0245; F02D 41/1447;
(Continued)

(56) References Cited

U.S. PATENT DOCUMENTS 5,211,010 A * 5/1993 Hirota ............... F02B 37/18
                                                60/286
7,614,229 B2 * 11/2009 Irisawa ............. F02B 37/18
                                                60/602
(Continued)

FOREIGN PATENT DOCUMENTS

CN       101091042 A    12/2007
EP       2 489 852 A1    8/2012
(Continued)

*Primary Examiner* — Thai Ba Trieu
(74) *Attorney, Agent, or Firm* — Oblon, McClelland, Maier & Neustadt, L.L.P.

(57) ABSTRACT

A control system includes a supercharged engine and an electronic control unit. The supercharged engine including: a combustion chamber; an exhaust passage; a turbine; and an exhaust catalyst. The turbine includes a turbine wheel, and a turbine control valve. The electronic control unit is configured to calculate a first exhaust gas temperature and a second exhaust gas temperature that are temperatures of exhaust gas flowing into the exhaust catalyst. The electronic control unit is configured to control the turbine control valve such that: the turbine control valve is set to the first valve opening degree when the first exhaust gas temperature is higher than the second exhaust gas temperature; and that the turbine control valve is set to the second valve opening degree when the second exhaust gas temperature is higher than the first exhaust gas temperature.

7 Claims, 6 Drawing Sheets

(51) Int. Cl.
*F01N 13/00* (2010.01)
*F02B 37/18* (2006.01)
*F02D 41/14* (2006.01)
*F02D 23/02* (2006.01)
*F02D 41/00* (2006.01)
*F01N 9/00* (2006.01)
F01N 3/035 (2006.01)
F02D 41/18 (2006.01)
F02B 37/00 (2006.01)
F02B 37/007 (2006.01)
F02B 37/013 (2006.01)
F02B 37/22 (2006.01)
F02B 37/24 (2006.01)

(52) U.S. Cl.
CPC ............ *F02B 37/183* (2013.01); *F02D 23/02* (2013.01); *F02D 41/0007* (2013.01); *F02D 41/0245* (2013.01); *F02D 41/1447* (2013.01); F01N 3/035 (2013.01); F01N 9/002 (2013.01); F01N 2560/06 (2013.01); F01N 2900/1404 (2013.01); F01N 2900/1602 (2013.01); F02B 37/001 (2013.01); F02B 37/004 (2013.01); F02B 37/007 (2013.01); F02B 37/013 (2013.01); F02B 37/18 (2013.01); F02B 37/22 (2013.01); F02B 37/24 (2013.01); F02D 41/0255 (2013.01); F02D 41/1448 (2013.01); F02D 41/18 (2013.01); F02D 2200/0812 (2013.01); F02D 2200/602 (2013.01); F02D 2250/18 (2013.01); Y02T 10/144 (2013.01); Y02T 10/26 (2013.01); Y02T 10/47 (2013.01)

(58) Field of Classification Search
CPC .. F02D 41/0255; F02D 41/1448; F02D 41/18; F02D 2200/0812; F02D 2200/602; F02D 2250/18; F02B 37/18; F02B 37/183; F02B 37/186; F02B 37/001; F02B 37/004; F02B 37/007; F02B 37/013; F02B 37/22; F02B 37/24; F01N 9/00; F01N 13/008; F01N 3/035; F01N 9/002; F01N 2560/06; F01N 2900/1404; F01N 2900/1602; Y02T 10/144; Y02T 10/26; Y02T 10/47
USPC .................. 60/602, 611–612, 280, 286, 297; 123/562
See application file for complete search history.

(56) References Cited

U.S. PATENT DOCUMENTS

| | | |
|---|---|---|
| 2012/0279216 A1 | 11/2012 | Otsuka |
| 2013/0167509 A1 | 7/2013 | Nishimura |
| 2014/0360179 A1* | 12/2014 | Doering ................ F02B 37/183 60/602 |
| 2017/0184014 A1* | 6/2017 | Ueno .................... F02B 37/186 |

FOREIGN PATENT DOCUMENTS

| | | |
|---|---|---|
| JP | 2007-146854 | 6/2007 |
| JP | 2009-185767 | 8/2009 |
| JP | 2009-228486 | 10/2009 |
| JP | 2013-136986 | 7/2013 |
| JP | 2013-139733 | 7/2013 |

* cited by examiner

SUPERCHARGED ENGINE CONTROL SYSTEM

INCORPORATION BY REFERENCE

The disclosure of Japanese Patent Application No. 2016-051104 filed on Mar. 15, 2016 including the specification, drawings and abstract is incorporated herein by reference in its entirety.

BACKGROUND

1. Technical Field

The disclosure relates to a supercharged engine control system that is applied to a supercharged engine that includes an exhaust passage in which a turbine having a turbine wheel rotating through the blowing of exhaust gas on the turbine wheel is provided, and that is provided with an exhaust catalyst in a region downstream of the turbine in the exhaust passage.

2. Description of Related Art

A supercharged engine control system as mentioned above is disclosed in Japanese Patent Application Publication No. 2007-146854 (JP 2007-146854 A). A turbine of a supercharged engine to which the control system of Japanese Patent Application Publication No. 2007-146854 (JP 2007-146854 A) is applied is provided with a bypass passage that allows exhaust gas to flow bypassing a turbine wheel, and a turbine control valve that blocks the flow of exhaust gas through the bypass passage upon being closed. Moreover, it is described in Japanese Patent Application Publication No. 2007-146854 (JP 2007-146854 A) that when the temperature of exhaust gas flowing into an exhaust catalyst is low, the turbine control valve is opened such that exhaust gas flows bypassing the turbine wheel, and to thereby raise the temperature of exhaust gas flowing into the exhaust catalyst (hereinafter referred to as a catalyst inflow exhaust gas temperature).

SUMMARY

When exhaust gas passes through the turbine wheel, the temperature of exhaust gas falls due to expansion work for rotating the turbine wheel. Therefore, in a case where the turbine control valve is opened such that exhaust gas flows bypassing the turbine wheel, the temperature of exhaust gas does not fall due to the expansion work as mentioned above before the exhaust gas flows into the catalyst. However, when exhaust gas bypasses the turbine wheel, the back pressure falls so as to change in the operating state of the supercharged engine. In the case where the change in operating state at this time entails a fall in exhaust gas temperature, the opening of the turbine control valve may lead to a fall in the catalyst inflow exhaust temperature as an adverse effect.

The disclosure provides a supercharged engine control system that can further raise the temperature of exhaust gas flowing into an exhaust catalyst.

According to one aspect of the disclosure, a control system including: a supercharged engine and an electronic control unit. The supercharged engine including:

a combustion chamber; an exhaust passage that exhaust gas discharged from the combustion chamber flows through; a turbine; and an exhaust catalyst provided in a region downstream of the turbine in the exhaust passage. The turbine is provided in the exhaust passage, and includes a turbine wheel and a turbine control valve. The turbine wheel rotates through blowing of exhaust gas on the turbine wheel. The turbine control valve changes a manner of flow of exhaust gas that is blown on the turbine wheel and flows in accordance with a change in a valve opening degree. The turbine control valve is configured such that the valve opening degree of the turbine control valve is changed. The valve opening degree includes a first valve opening degree and a second valve opening degree. A pressure loss of the exhaust gas passing through the turbine is smaller when the turbine control valve is set to the second valve opening degree than when the turbine control valve is set to the first valve opening degree. The electronic control unit configured to calculate a first exhaust gas temperature and a second exhaust gas temperature. The first exhaust gas temperature is a catalyst inflow exhaust gas temperature in a case where the valve opening degree of the turbine control valve is set to the first valve opening degree while maintaining an engine torque. The catalyst inflow exhaust gas temperature is a temperature of exhaust gas flowing into the exhaust catalyst. The second exhaust gas temperature is the catalyst inflow exhaust gas temperature in a case where the valve opening degree of the turbine control valve is set to the second valve opening degree while maintaining an engine torque. The electronic control unit is configured to control the turbine control valve such that the valve opening degree of the turbine control valve is set to the first valve opening degree when the first exhaust gas temperature is higher than the second exhaust gas temperature. The electronic control unit is configured to control the turbine control valve such that the valve opening degree of the turbine control valve is set to the second valve opening degree when the second exhaust gas temperature is higher than the first exhaust gas temperature.

The temperature of exhaust gas flowing into the aforementioned catalyst will be referred to hereinafter as "a catalyst inflow exhaust gas temperature". In the aforementioned supercharged engine, when the valve opening degree of the turbine control valve is set to the second valve opening degree at which the pressure loss of exhaust gas passing through the turbine is smaller, the amount of heat lost by exhaust gas due to the expansion work in passing through the turbine becomes small, so the temperature of exhaust gas in the turbine is restrained from falling. In consequence, in a case where the temperature of exhaust gas that has just been discharged from the combustion chamber remains the same, the catalyst inflow exhaust gas temperature is higher when the valve opening degree of the turbine control valve is set to the second valve opening degree than when the valve opening degree of the turbine control valve is set to the first valve opening degree.

On the other hand, when the valve opening degree of the turbine control valve is set to the first valve opening degree at which the pressure loss of exhaust gas passing through the turbine is larger, the back pressure of the supercharged engine rises. In the case where the pump loss of the supercharged engine increases due to the rise in back pressure at this time, the output of the supercharged engine cannot be maintained unless a larger amount of fuel is burned. In a case where the supercharged engine is operated such that a net engine torque is maintained in such a case, the temperature of exhaust gas that has just been discharged from the combustion chamber is higher when the valve opening degree of the turbine control valve is set to the first valve opening degree than when the valve opening degree of the turbine control valve is set to the second valve opening degree. Therefore, even in the case where the amount of fall in the temperature of exhaust gas passing through the turbine is large, the catalyst inflow exhaust gas temperature may be higher when the valve opening degree of the turbine control valve is set to the first valve opening degree than when the valve opening degree of the turbine control valve is set to the second valve opening degree.

In contrast, the aforementioned supercharged engine control system includes an electronic control unit. The electronic control unit is configured to obtain a first exhaust gas temperature as a catalyst inflow exhaust gas temperature in the case where the valve opening degree of the turbine control valve is set to the first valve opening degree while maintaining a current engine torque, and a second exhaust gas temperature as a catalyst inflow exhaust gas temperature in the case where the valve opening degree of the turbine control valve is set to the second valve opening degree while maintaining a current engine torque. The electronic control unit is configured to control the turbine control valve in such a manner as to set the valve opening degree of the turbine control valve to the first valve opening degree when the first exhaust gas temperature is higher than the second exhaust gas temperature, and to set the valve opening degree of the turbine control valve to the second valve opening degree when the second exhaust gas temperature is higher than the first exhaust gas temperature. That is, the valve opening degree of the turbine control valve is set to that one of the first valve opening degree and the second valve opening degree which corresponds to the higher catalyst inflow exhaust gas temperature. Accordingly, the aforementioned supercharged engine control system makes it possible to further raise the temperature of exhaust gas flowing into the catalyst.

According to the above mentioned aspect of the disclosure, the turbine may further include a bypass passage that is configured such that exhaust gas bypasses the turbine wheel through flowing in the bypass passage. The first valve opening degree may be a valve opening degree at which the turbine control valve blocks flow of exhaust gas through the bypass passage. The second valve opening degree may be a valve opening degree at which exhaust gas flows through the bypass passage. In this turbine, when exhaust gas flows through the bypass passage, the flow rate of exhaust gas passing through the turbine wheel decreases correspondingly, so the pressure loss of exhaust gas passing through the turbine becomes small. Consequently, in this case, the valve opening degree at which the flow of exhaust gas through the bypass passage is blocked is equal to the aforementioned first valve opening degree, and the valve opening degree at which the flow of exhaust gas through the bypass passage is permitted is equal to the aforementioned second valve opening degree.

According to the above mentioned aspect of the disclosure, the turbine control valve may be configured to change an opening area of a blowing port of exhaust gas blown on the turbine wheel. The opening area at the first valve opening degree may be smaller than the opening area at the second valve opening degree.

Incidentally, as described above, when the valve opening degree of the turbine control valve is changed from the second valve opening degree to the first valve opening degree, the pump loss of the supercharged engine increases, and the engine torque decreases. When an unintended decrease in engine torque is caused in this manner, a driver is estimated to perform an operation of increasing the engine torque with a view to recovering the decrease in engine torque. It should be noted, however, that when the engine torque continues to decrease contrary to the estimation, the catalyst inflow exhaust gas temperature becomes lower than the first exhaust gas temperature that is obtained on the premise of the output before the decrease in engine torque. Therefore, even in the case where the electronic control unit sets the valve opening degree of the turbine control valve to the first valve opening degree based on the estimation that the catalyst inflow exhaust gas temperature becomes higher, the catalyst inflow exhaust gas temperature may actually be made higher when the valve opening degree of the turbine control valve is set to the second valve opening degree, depending on what happens afterward.

According to the above mentioned aspect of the disclosure, the electronic control unit may be configured to control the supercharged engine such that an engine torque is maintained when a pump loss of the supercharged engine changes. In this case, when the pump loss of the supercharged engine changes as a result of the control of the turbine control valve by the electronic control unit, a current engine torque is maintained by the electronic control unit without depending on the driver's operation. Therefore, the temperature of exhaust gas flowing into the catalyst is more reliably raised.

According to the above mentioned aspect of the disclosure, the electronic control unit may control the supercharged engine such that an engine torque corresponding to a required torque that is set in accordance with an operation amount of an accelerator pedal is ensured.

According to the above mentioned aspect of the disclosure, the electronic control unit may perform control of the valve opening degree of the turbine control valve based on the first exhaust gas temperature and the second exhaust gas temperature when a predetermined catalyst heat-up condition is fulfilled. In this case, when the catalyst heat-up condition is not fulfilled, the turbine control valve can be controlled in accordance with other requirements such as the output performance, fuel consumption performance and the like of the supercharged engine. According to the above mentioned aspect of the disclosure, the exhaust catalyst may be configured to collect particulate matters in exhaust gas as a filtering function, and the catalyst heat-up condition may be set in such a manner as to be fulfilled in executing filter recovery for recovering the filtering function by burning the particulate matters collected by the exhaust catalyst.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
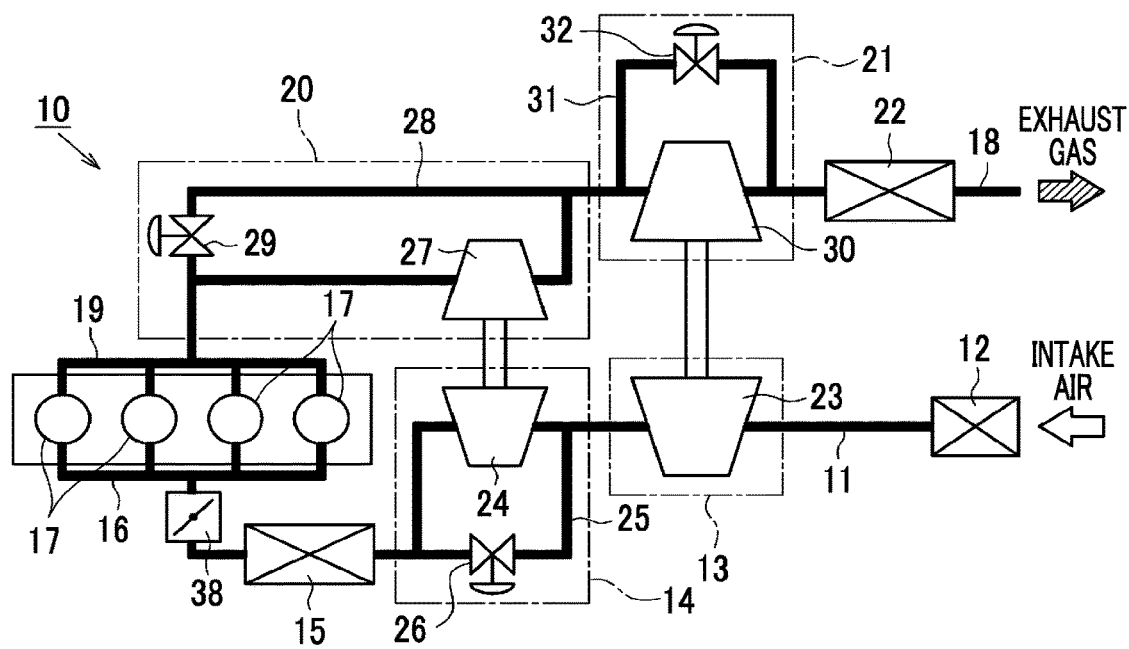
FIG. 1 is a view schematically showing the configuration of an intake/exhaust system of a supercharged engine to which a supercharged engine control system according to one of the embodiments of the disclosure is applied.

A supercharged engine control system according to one of the embodiments of the disclosure will be described hereinafter in detail with reference to FIGS. 1 to 8. FIG. 1 shows the configuration of an intake/exhaust system of a supercharged engine 10 to which the control system according to the present embodiment of the disclosure is applied. This supercharged engine 10 adopts a two-stage sequential turbo system having two turbines, namely, a high pressure-stage turbine 20 and a low pressure-stage turbine 21.

An air cleaner 12 that filters impurities (dust and the like) in intake air is provided in a most upstream portion of an intake passage 11 of the supercharged engine 10. Besides, the intake passage 11 is provided with two compressors that are different in size, namely, a low pressure-stage compressor 13 and a high pressure-stage compressor 14 that is located downstream of the low pressure-stage compressor 13. Furthermore, an intercooler 15 that cools intake air, a throttle valve 38 that adjusts the flow rate of intake air in the intake passage 11, and an intake manifold 16 as a branch pipe that distributes intake air to respective cylinders of the supercharged engine 10 are provided downstream of the high pressure-stage compressor 14 in the intake passage 11. Moreover, the intake passage 11 is connected to combustion chambers 17 of the respective cylinders via the intake manifold 16.

The low pressure-stage compressor 13 includes a low pressure-stage compressor wheel 23 that compresses intake air in accordance with rotation. The high pressure-stage compressor 14 includes a high pressure-stage compressor wheel 24 that is smaller in size than the low pressure-stage compressor wheel 23, as a compressor wheel that compresses intake air in accordance with rotation. Besides, the high pressure-stage compressor 14 includes a bypass passage 25 that allows intake air to flow bypassing the high pressure-stage compressor wheel 24, and a compressor control valve 26 that adjusts the flow rate of intake air in the bypass passage 25. Incidentally, when the valve opening degree of the compressor control valve 26 is set to a value corresponding to a fully closed state of the compressor control valve 26, the flow of intake air through the bypass passage 25 is blocked, and the entire intake air flowing into the high pressure-stage compressor 14 passes through the high pressure-stage compressor wheel 24. Besides, when the valve opening degree of the compressor control valve 26 is set to a value corresponding to a fully open state of the compressor control valve 26, the flow of intake air through the bypass passage 25 is permitted, and most of the intake air flowing into the high pressure-stage compressor 14 flows bypassing the high pressure-stage compressor wheel 24.

On the other hand, an exhaust passage 18 of the supercharged engine 10 is provided with an exhaust manifold 19 as a collecting pipe that collects exhaust gases from the combustion chambers 17 of the respective cylinders. Two turbines that are different in size, namely, a high pressure-stage turbine 20 and a low pressure-stage turbine 21 that is located downstream of the high pressure-stage turbine 20 are provided downstream of the exhaust manifold 19 in the exhaust passage 18. Furthermore, an exhaust catalyst 22 is provided downstream of the low pressure-stage turbine 21 in the exhaust passage 18. Incidentally, this catalyst 22 has a filtering function for collecting particulate matters (PM) in exhaust gas.

The high pressure-stage turbine 20 includes a high pressure-stage turbine wheel 27 that rotates through the blowing of exhaust gas on the high pressure-stage turbine wheel 27. The high pressure-stage turbine wheel 27 is coupled to the high pressure-stage compressor wheel 24 of the high pressure-stage compressor 14 in such a manner as to rotate integrally with the high pressure-stage compressor wheel 24. Besides, the high pressure-stage turbine 20 includes a bypass passage 28 that is configured such that exhaust gas flows bypassing the high pressure-stage turbine wheel 27, and a high pressure-stage turbine control valve 29 that adjusts the flow rate of exhaust gas in the bypass passage 28. Incidentally, when the valve opening degree of the high pressure-stage turbine control valve 29 is set to a value corresponding to a fully closed state of the high pressure-stage turbine control valve 29, the flow of exhaust gas through the bypass passage 28 is blocked, and the entire exhaust gas flowing into the high pressure-stage turbine 20 passes through the high pressure-stage turbine wheel 27. Besides, when the valve opening degree of the high pressure-stage turbine control valve 29 is set to a value corresponding to a fully open state of the high pressure-stage turbine control valve 29, the flow of exhaust gas through the bypass passage 28 is permitted, and most of the exhaust gas flowing into the high pressure-stage turbine 20 flows bypassing the high pressure-stage turbine wheel 27.

The low pressure-stage turbine 21 includes a low pressure-stage turbine wheel 30 that is larger in size than the high pressure-stage turbine wheel 27, as a turbine wheel that rotates through the blowing of exhaust gas on the low pressure-stage turbine wheel 30. The low pressure-stage turbine wheel 30 is coupled to the low pressure-stage compressor wheel 23 of the low pressure-stage compressor 13 in such a manner as to rotate integrally with the low pressure-stage compressor wheel 23. Besides, the low pressure-stage turbine 21 includes a bypass passage 31 that is configured such that exhaust gas flows bypassing the low pressure-stage turbine wheel 30, and a low pressure-stage turbine control valve 32 that adjusts the flow rate of exhaust gas in the bypass passage 31. The low pressure-stage turbine wheel 30 is larger in size than the high pressure-stage turbine wheel 27. Incidentally, in the low pressure-stage turbine control valve 32 as well, when the valve opening degree of the low pressure-stage turbine control valve 32 is set to a value corresponding to a fully closed state of the low pressure-stage turbine control valve 32, the flow of exhaust gas through the bypass passage 31 is blocked, and the entire exhaust gas flowing into the low pressure-stage turbine 21 passes through the low pressure-stage turbine wheel 30. Besides, when the valve opening degree of the low pressure-stage turbine control valve 32 is set to a value corresponding to a fully open state of the low pressure-stage turbine control valve 32, the flow of exhaust gas through the bypass passage 31 is permitted, and most of the exhaust gas flowing into the low pressure-stage turbine 21 flows bypassing the low pressure-stage turbine wheel 30.

Figure 2:
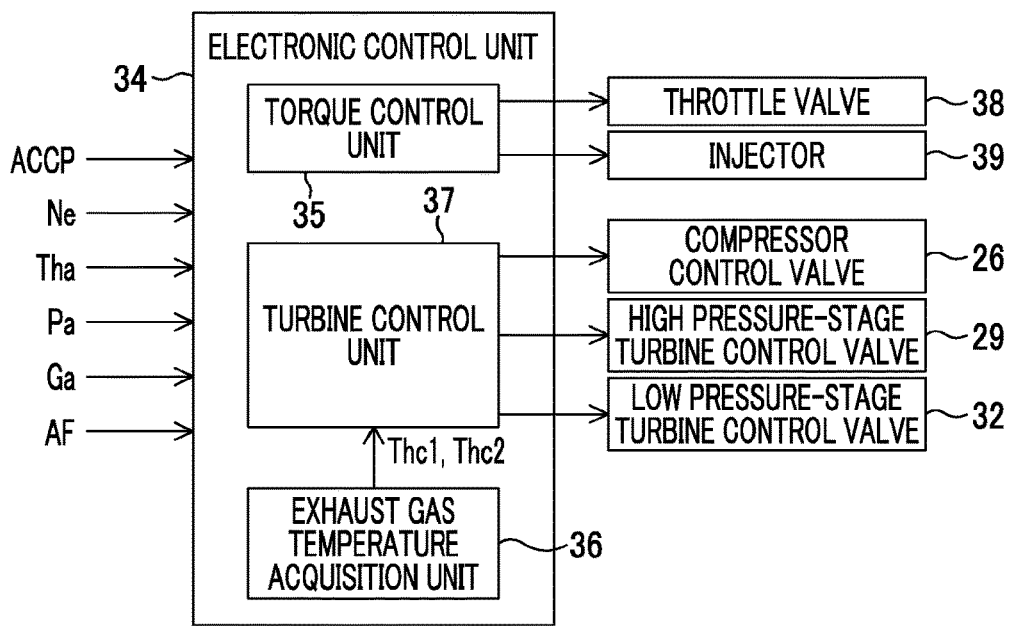
FIG. 2 is a view schematically showing the configuration of the supercharged engine control system according to the embodiment of the disclosure.

FIG. 2 shows the configuration of a supercharged engine control system according to the present embodiment of the disclosure that is applied to the supercharged engine 10 that includes the intake/exhaust system configured as described above. As shown in the drawing, the supercharged engine control system includes an electronic control unit 34. The electronic control unit 34 acquires an accelerator pedal operation amount ACCP, an engine rotational speed Ne, an intake air temperature Tha, an in-manifold intake air pressure Pa, an intake air flow rate Ga, an air-fuel ratio AF and the like from sensors that are installed in respective portions of the supercharged engine 10 and a vehicle. Incidentally, the intake air temperature Tha mentioned herein is a temperature of intake air measured in a region upstream of the low pressure-stage compressor 13 in the intake passage 11, and the in-manifold intake air pressure Pa is a pressure of intake air measured in the intake manifold 16. Besides, the intake air flow rate Ga is a flow rate of intake air measured in a region upstream of the low pressure-stage compressor 13 in the intake passage 11. Furthermore, the air-fuel ratio AF is a ratio of the weight of fuel to the weight of air in an air-fuel mixture burned in the combustion chambers 17, and the value of the air-fuel ratio is obtained from a concentration of oxygen in exhaust gas measured in the exhaust manifold 19.

The electronic control unit 34 includes a torque control unit 35, an exhaust gas temperature acquisition unit 36 and a turbine control unit 37. The torque control unit 35 controls the torque of the supercharged engine 10 (an engine torque) through the control of the opening degree of the throttle valve 38 and the fuel injection amount of an injector 39. The exhaust gas temperature acquisition unit 36 estimates a first exhaust gas temperature Thc1 and a second exhaust gas temperature Thc2, which will be described later. Furthermore, the turbine control unit 37 performs the control of the aforementioned compressor control valve 26, the aforementioned high pressure-stage turbine control valve 29 and the aforementioned low pressure-stage turbine control valve 32 (hereinafter referred to as turbine control).

The torque control unit 35 performs torque control of the supercharged engine 10 in the following manner. That is, the torque control unit 35 calculates a required torque as a required value of the torque of the supercharged engine 10 (the engine torque), based on the accelerator pedal operation amount ACCP and the like. Then, the torque control unit 35 controls the opening degree of the throttle valve 38, the fuel injection amount of the injector 39 and the like such that an engine torque corresponding to the required torque is ensured, in consideration of a current operating condition of the supercharged engine (the engine rotational speed Ne, the intake air flow rate Ga and the like).

On the other hand, the turbine control unit 37 changes the contents of turbine control, depending on whether or not a catalyst heat-up condition for regenerating a PM collecting function of the catalyst 22 is fulfilled. Incidentally, the electronic control unit 34 calculates a PM discharge amount of the supercharged engine 10 based on the intake air flow rate Ga and the air-fuel ratio AF, and obtains an amount of PM collected by the catalyst 22 (a PM deposition amount) from a result of the calculation. Then, when the PM deposition amount is larger than a predetermined value and the supercharged engine 10 is operated in a predetermined filter regeneration execution region, the electronic control unit 34 attempts to heat up the catalyst 22 to a temperature required for the combustion of PM, with a view to regenerating the filtering function of the catalyst 22 through the combustion of the collected PM. That is, in the present embodiment of the disclosure, the catalyst heat-up condition is that the PM deposition amount is larger than the predetermined value and the supercharged engine 10 is operated in the predetermined filter regeneration execution region.

When the catalyst heat-up condition is not fulfilled, the turbine control unit 37 performs normal turbine control for ensuring a supercharging pressure corresponding to the operating condition of the supercharged engine 10, based on the engine torque and the engine rotational speed Ne.

Figure 3:
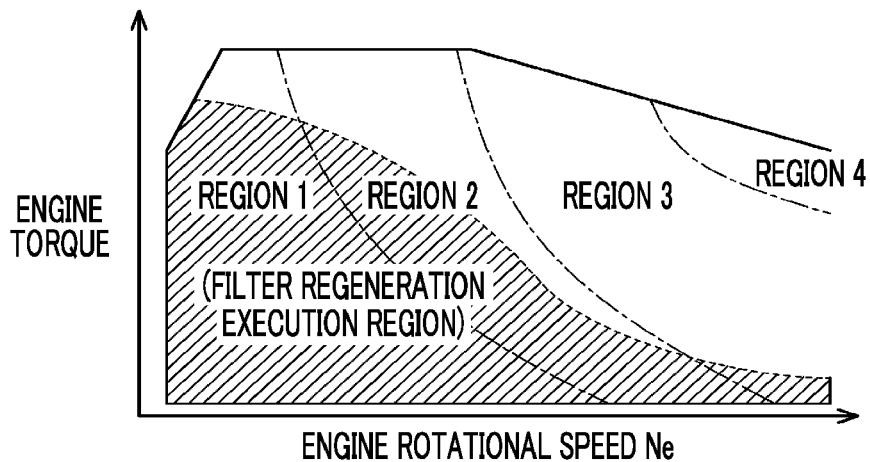
FIG. 3 is a view showing the segmentation of control regions and a mode of setting a filter regeneration execution region in normal turbine control in the supercharged engine control system according to the embodiment of the disclosure.

FIG. 3 shows segmentation of control regions in turbine control in this case. Incidentally in the drawing, the aforementioned filter regeneration execution region is also shown by being hatched. In a region 1, the valve opening degrees of the compressor control valve 26, the high pressure-stage turbine control valve 29 and the low pressure-stage turbine control valve 32 are all set to the values corresponding to the fully closed states of the compressor control valve 26, the high pressure-stage turbine control valve 29, and the low pressure-stage turbine control valve 32 respectively. Thus, a more or less high supercharging pressure can be ensured even when the flow rate of exhaust gas is small, by causing exhaust gas to thoroughly flow to the high pressure-stage turbine wheel 27 and the low pressure-stage turbine wheel 30.

In a region 2, the valve opening degrees of the compressor control valve 26 and the low pressure-stage turbine control valve 32 are set to the values corresponding to the fully closed states of the compressor control valve 26 and the low pressure-stage turbine control valve 32 respectively. Besides, in the region 2, the control of the opening degree of the high pressure-stage turbine control valve 29 is performed such that a supercharging pressure corresponding to the operating condition of the supercharged engine 10 is obtained.

In a region 3, the valve opening degrees of the compressor control valve 26 and the high pressure-stage turbine control valve 29 are set to the values corresponding to the fully open states of the compressor control valve 26 and the high pressure-stage turbine control valve 29 respectively, and the valve opening degree of the low pressure-stage turbine control valve 32 is set to the value corresponding to the fully closed state of the low pressure-stage turbine control valve 32. Thus, the supercharging operation of the high pressure-stage compressor 14 is stopped, so only the low pressure-stage compressor 13 is used to perform supercharging.

In a region 4, the valve opening degrees of the compressor control valve 26 and the high pressure-stage turbine control valve 29 are set to the values corresponding to the fully open state of the compressor control valve 26 and the high pressure-stage turbine control valve 29 respectively, and the supercharging operation of the high pressure-stage compressor 14 is stopped. Besides, in the region 4, the control of the opening degree of the low pressure-stage turbine control valve 32 is performed such that the supercharging pressure does not rise excessively.

In contrast, when the catalyst heat-up condition is fulfilled, the turbine control unit 37 performs catalyst heat-up turbine control for further raising the temperature of exhaust gas flowing into the catalyst 22 (hereinafter referred to as a catalyst inflow exhaust gas temperature). At this time, the turbine control unit 37 sets the valve opening degrees of the compressor control valve 26 and the low pressure-stage turbine control valve 32 to the values corresponding to the fully open states of the compressor control valve 26 and the low pressure-stage turbine control valve 32 respectively. Besides, at this time, the exhaust gas temperature acquisition unit 36 estimates the first exhaust gas temperature Thc1 and the second exhaust gas temperature Thc2. The first exhaust gas temperature Thc1 is an estimated value of the catalyst inflow exhaust gas temperature in the case where the valve opening degree of the high pressure-stage turbine control valve 29 is set to the value corresponding to the fully closed state of the high pressure-stage turbine control valve 29 while maintaining a current engine torque. Besides, the second exhaust gas temperature Thc2 is an estimated value of the catalyst inflow exhaust gas temperature in the case where the valve opening degree of the high pressure-stage turbine control valve 29 is set to the value corresponding to the fully open state of the high pressure-stage turbine control valve 29 while maintaining a current engine torque. Then, when the first exhaust gas temperature Thc1 is higher than the second exhaust gas temperature Thc2, the turbine control unit 37 sets the valve opening degree of the high pressure-stage turbine control valve 29 to the value corresponding to the fully closed state of the high pressure-stage turbine control valve 29. When the second exhaust gas temperature Thc2 is higher than the first exhaust gas temperature Thc1, the turbine control unit 37 sets the valve opening degree of the high pressure-stage turbine control valve 29 to the value corresponding to the full open state of the high pressure-stage turbine control valve 29.

Estimation of the first exhaust gas temperature Thc1 and the second exhaust gas temperature Thc2 by the exhaust gas temperature acquisition unit 36 will now be described.

In estimating the first exhaust gas temperature Thc1 and the second exhaust gas temperature Thc2, the exhaust gas temperature acquisition unit 36 first calculates, based on the intake air flow rate Ga, an in-manifold exhaust gas pressure Pem1 in the case where the valve opening degree of the high pressure-stage turbine control valve 29 is set to the value corresponding to the fully closed state of the high pressure-stage turbine control valve 29, and an in-manifold exhaust gas pressure Pem2 in the case where the valve opening degree of the high pressure-stage turbine control valve 29 is set to the value corresponding to the fully open state of the high pressure-stage turbine control valve 29, respectively. Each of the in-manifold exhaust gas pressures mentioned herein represents a pressure of exhaust gas in the exhaust manifold 19.

Figure 4:
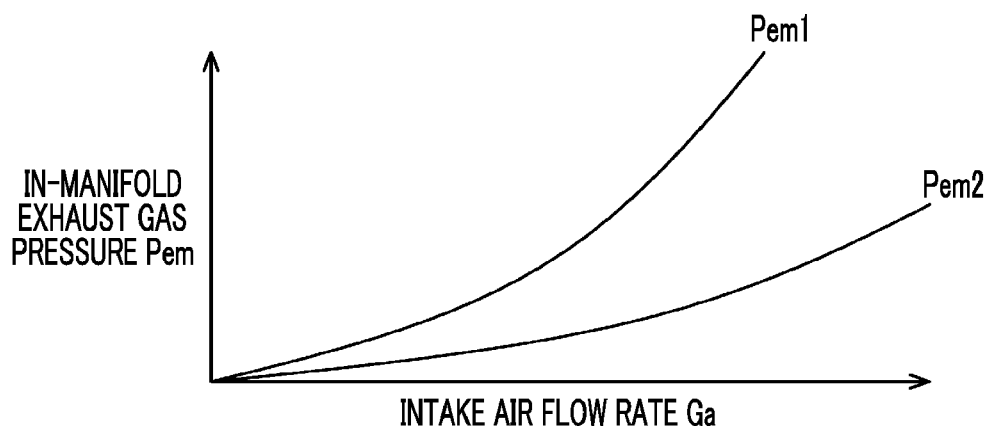
FIG. 4 is a graph showing a relationship between in-manifold exhaust gas pressure and intake air flow rate when a turbine control valve is fully open and fully closed respectively in a supercharged engine.

FIG. 4 shows a relationship between the intake air flow rate Ga and the in-manifold exhaust gas pressures Pem1 and Pem2. When the valve opening degree of the high pressure-stage turbine control valve 29 is set to the value corresponding to the fully open state of the high pressure-stage turbine control valve 29, most exhaust gas flows through the bypass passage 28 that bypasses the high pressure-stage turbine wheel 27. In contrast, when the valve opening degree of the high pressure-stage turbine control valve 29 is set to the value corresponding to the fully closed state of the high pressure-stage turbine control valve 29, the entire exhaust gas flows through the high pressure-stage turbine wheel 27 serving as a resistance against the flow of the exhaust gas, so the pressure loss of exhaust gas passing through the high pressure-stage turbine 20 is larger than when the valve opening degree of the high pressure-stage turbine control valve 29 is set to the value corresponding to the fully open state of the high pressure-stage turbine control valve 29. Accordingly, as shown in the drawing, in a case where the intake air flow rate Ga remains the same, the in-manifold exhaust gas pressure Pem1 in the case where the valve opening degree of the high pressure-stage turbine control valve 29 is set to the value corresponding to the fully closed state of the high pressure-stage turbine control valve 29 is higher than the in-manifold exhaust gas pressure Pem2 in the case where the valve opening degree of the high pressure-stage turbine control valve 29 is set to the value corresponding to the fully open state of the high pressure-stage turbine control valve 29.

Subsequently, the exhaust gas temperature acquisition unit 36 obtains a pump loss L1 of the supercharged engine 10 in the case where the valve opening degree of the high pressure-stage turbine control valve 29 is set to the value corresponding to the fully closed state of the high pressure-stage turbine control valve 29, from the in-manifold intake air pressure Pa and the in-manifold exhaust gas pressure Pem1. Besides, the exhaust gas temperature acquisition unit 36 obtains a pump loss L2 of the supercharged engine 10 in the case where the valve opening degree of the high pressure-stage turbine control valve 29 is set to the value corresponding to the fully open state of the high pressure-stage turbine control valve 29, from the in-manifold intake air pressure Pa and the in-manifold exhaust gas pressure Pem2.

Figure 5:
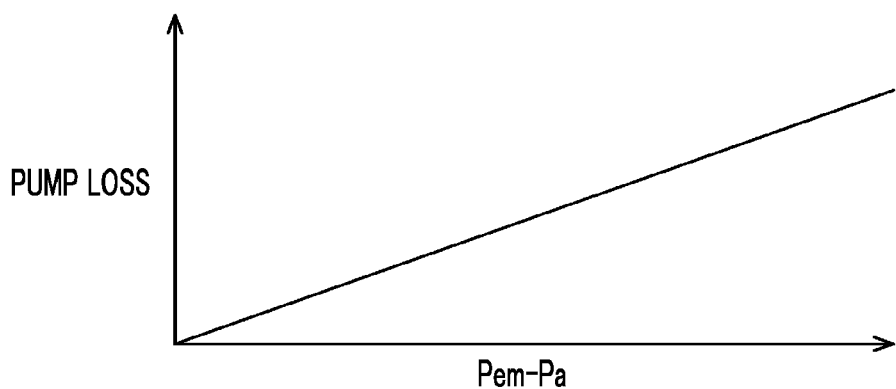
FIG. 5 is a graph showing a relationship between difference between in-manifold intake air pressure and in-manifold exhaust gas pressure and pump loss in the aforementioned supercharged engine.

FIG. 5 shows a relationship between the difference (=Pem−Pa) between the in-manifold intake air pressure Pa and the in-manifold exhaust gas pressure Pem and the pump loss of the supercharged engine 10. As shown in the drawing, as the difference between the in-manifold intake air pressure Pa and the in-manifold exhaust gas pressure Pem increases, the pump loss also increases. In consequence, the pump loss of the supercharged engine 10 is larger when the valve opening degree of the high pressure-stage turbine control valve 29 is set to the value corresponding to the fully closed state of the high pressure-stage turbine control valve 29 than when the valve opening degree of the high pressure-stage turbine control valve 29 is set to the value corresponding to the fully open state of the high pressure-stage turbine control valve 29.

Subsequently, the exhaust gas temperature acquisition unit 36 obtains, based on the pump loss L1, a fuel flow rate Gf1, an intake air flow rate Ga1 and an air-fuel ratio AF1 in the case where the valve opening degree of the high pressure-stage turbine control valve 29 is set to the value corresponding to the fully closed state of the high pressure-stage turbine control valve 29, while maintaining a current engine torque. Besides, the exhaust gas temperature acquisition unit 36 obtains, based on the pump loss L2, a fuel flow rate Gf2, an intake air flow rate Ga2 and an air-fuel ratio AF2 in the case where the valve opening degree of the high pressure-stage turbine control valve 29 is set to the value corresponding to the fully open state of the high pressure-stage turbine control valve 29, while maintaining a current engine torque. The fuel flow rate represents the sum of weights of fuels injected and supplied to the combustion chambers 17 of the respective cylinders of the supercharged engine 10 per unit time. Incidentally, as the pump loss increases, the fuel flow rate and intake air flow rate needed to maintain a current engine torque increase. Therefore, the fuel flow rate and intake air flow rate needed to maintain a current engine torque are larger when the valve opening degree of the high pressure-stage turbine control valve 29 is set to the value corresponding to the fully closed state of the high pressure-stage turbine control valve 29 than when the valve opening degree of the high pressure-stage turbine control valve 29 is set to the value corresponding to the fully open state of the high pressure-stage turbine control valve 29.

Furthermore, the exhaust gas temperature acquisition unit 36 calculates a temperature of exhaust gas flowing into the high pressure-stage turbine wheel 27 (hereinafter referred to as a turbine inflow exhaust gas temperature Tin) in the case where the valve opening degree of the high pressure-stage turbine control valve 29 is set to the value corresponding to the fully closed state of the high pressure-stage turbine control valve 29 while maintaining a current engine torque. Calculation of the turbine inflow exhaust gas temperature Tin is carried out with reference to a calculation map that is stored in advance in the electronic control unit 34, based on the fuel flow rate Gf1 and the air-fuel ratio AF1. A relationship that is obtained in advance through an experiment or the like to represent how the intake air flow rate Ga1 and the air-fuel ratio AF1 are related to the turbine inflow exhaust gas temperature Tin is stored in this calculation map.

Subsequently, the exhaust gas temperature acquisition unit 36 calculates, based on an expression (1) shown below, an energy E of exhaust gas flowing into the high pressure-stage turbine wheel 27 in the case where the valve opening degree of the high pressure-stage turbine control valve 29 is set to the value corresponding to the fully closed state of the high pressure-stage turbine control valve 29. Incidentally, "Cp" in the expression (1) represents a constant pressure specific heat of exhaust gas.

$$E = (Ga1 + Gf1) \times Cp \times Tin \quad (1)$$

Besides, the exhaust gas temperature acquisition unit 36 obtains, based on the calculated energy E of exhaust gas, an expansion ratio of exhaust gas passing through the high pressure-stage turbine wheel 27, and calculates, from the expansion ratio and the intake air flow rate Ga1, a turbine efficiency η of the high pressure-stage turbine 20 in the case where the valve opening degree of the high pressure-stage turbine control valve 29 is set to the value corresponding to the fully closed state of the high pressure-stage turbine control valve 29. Calculation of the turbine efficiency η at this time is carried out with reference to the calculation map that is stored in the electronic control unit 34.

Figure 6:
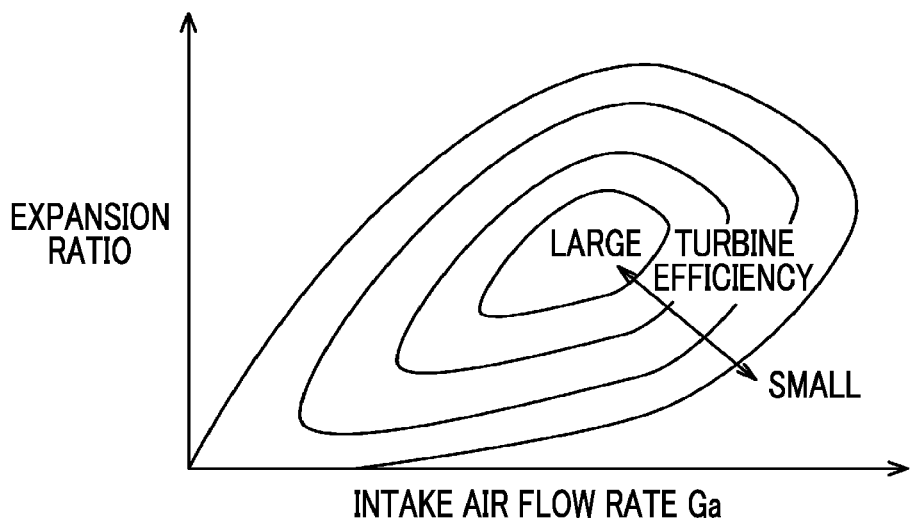
FIG. 6 is a graph showing a relationship among intake air flow rate, expansion ratio and turbine efficiency in the aforementioned supercharged engine.

FIG. 6 shows a relationship between the expansion ratio and the intake air flow rate Ga in the calculation map for calculating the turbine efficiency η. A relationship that is obtained in advance through an experiment or the like to represent how the expansion ratio and intake air flow rate in the supercharged engine 10 are related to the turbine efficiency η of the high pressure-stage turbine 20 is stored in this calculation map.

Then, the exhaust gas temperature acquisition unit 36 calculates the first exhaust gas temperature Thc1 based on the turbine inflow exhaust gas temperature Tin and the turbine efficiency η, according to an expression (2) shown below.

$$Thc1 = \eta \times Tin \quad (2)$$

On the other hand, the exhaust gas temperature acquisition unit 36 obtains the second exhaust gas temperature Thc2 based on the intake air flow rate Ga2 and the air-fuel ratio AF2, with reference to the calculation map that is stored in advance in the electronic control unit 34. A relationship that is obtained in advance through an experiment or the like to represent how the intake air flow rate Ga2 and the air-fuel ratio AF2 are related to the second exhaust gas temperature Thc2 is stored in this calculation map.

Figure 7:
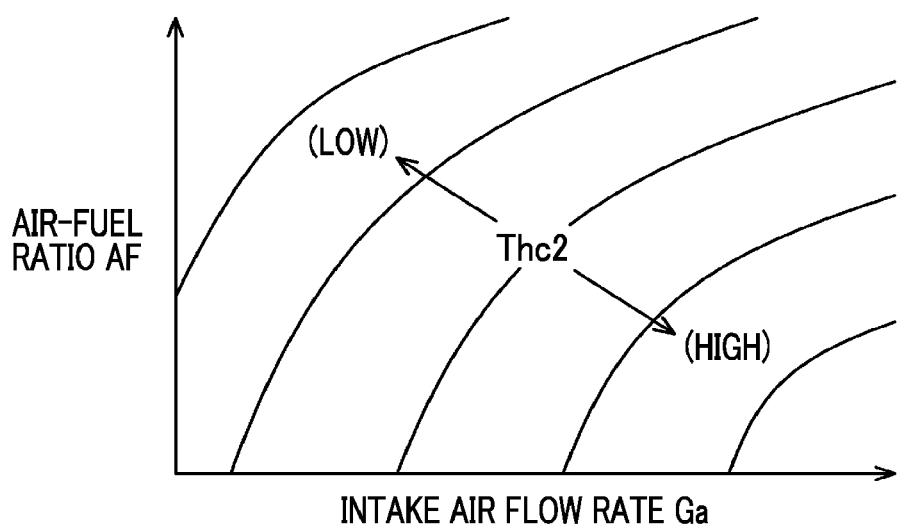
FIG. 7 is a graph showing a relationship among intake air flow rate, air-fuel ratio and second exhaust gas temperature in the aforementioned supercharged engine.

FIG. 7 shows how the intake air flow rate Ga2 and the air-fuel ratio AF2 are related to the second exhaust gas temperature Thc2 in the calculation map. As shown in the drawing, the second exhaust gas temperature Thc2 rises as the intake air flow rate Ga2 increases, or as the air-fuel ratio AF2 decreases and the concentration of fuel in the burned air-fuel mixture increases.

Figure 8:
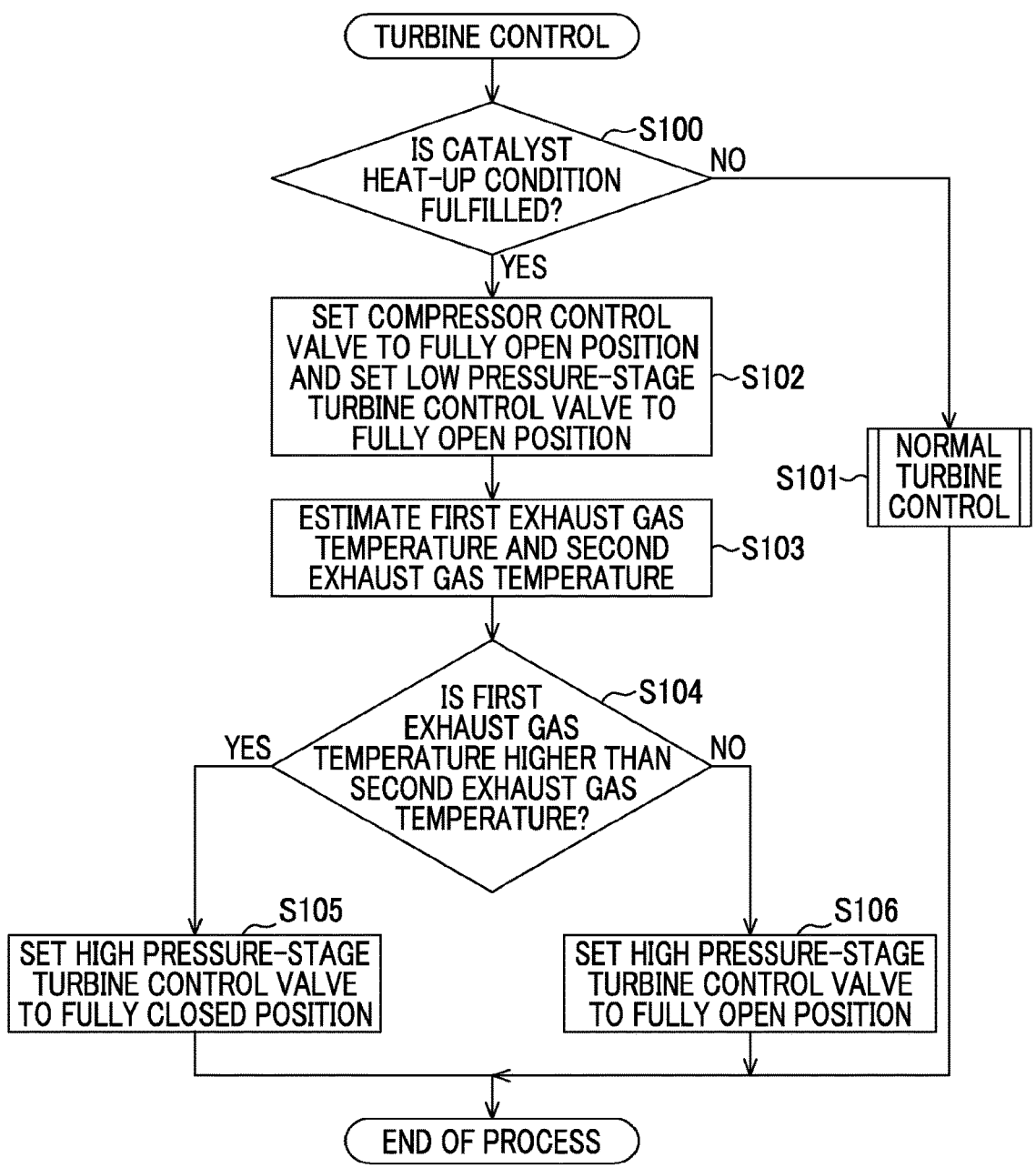
FIG. 8 is a flowchart showing the procedure of a process of turbine control that is performed in the aforementioned supercharged engine control system.

FIG. 8 shows a flowchart of a process regarding turbine control in this supercharged engine control system according to the present embodiment of the disclosure. The process of the flowchart is repeatedly executed on a predetermined control cycle by the electronic control unit 34 while the supercharged engine 10 is in operation.

When the process of the present flowchart is started, it is determined first in step S100 whether or not the catalyst heat-up condition is fulfilled. In a case where the catalyst heat-up condition is not fulfilled herein (NO in S100), the process is advanced to step S101. Then in step S101, normal turbine control for ensuring a supercharging pressure corresponding to an operating condition of the supercharged engine 10 is performed.

On the other hand, in a case where the catalyst heat-up condition is fulfilled (YES in S100), the valve opening degrees of the compressor control valve 26 and the low pressure-stage turbine control valve 32 are set to the values corresponding to the fully open states of the compressor control valve 26 and the low pressure-stage turbine control valve 32, in step S102. Besides, in subsequent step S103, the first exhaust gas temperature Thc1 and the second exhaust gas temperature Thc2 are estimated. Then in subsequent step S104, it is determined whether or not the first exhaust gas temperature Thc1 is higher than the second exhaust gas temperature Thc2.

In a case where the first exhaust gas temperature Thc1 is higher than the second exhaust gas temperature Thc2 (YES in S104), the process is advanced to step S105. In step S105, the valve opening degree of the high pressure-stage turbine control valve 29 is set to the value corresponding to the fully closed state of the high pressure-stage turbine control valve 29. On the other hand, in a case where the second exhaust gas temperature Thc2 is higher than the first exhaust gas temperature Thc1 or in a case where the second exhaust gas temperature Thc2 is equal to the first exhaust gas temperature Thc1 (NO in S105), the process is advanced to step S106. In step S106, the valve opening degree of the high pressure-stage turbine control valve 29 is set to the value corresponding to the fully open state of the high pressure-stage turbine control valve 29.

Incidentally, the processing procedure in step S103 of the present flowchart is carried out by the exhaust gas temperature acquisition unit 36, and the processing procedures in the other steps of the present flowchart are carried out by the turbine control unit 37.

Next, the operation of the supercharged engine control system according to the present embodiment of the disclosure configured as described above will be described.

When the PM deposition amount of the catalyst 22 becomes larger than a predetermined value, the electronic control unit 34 attempts to heat up the catalyst 22 with a view to regenerating the filtering function of the catalyst 22 by burning the PM deposited in the catalyst 22. At this time, the turbine control unit 37 performs catalyst heat-up turbine control for further raising the catalyst inflow exhaust gas temperature.

In catalyst heat-up turbine control, the turbine control unit 37 is configured such that intake air flows bypassing the high pressure-stage compressor wheel 24 by setting the valve opening degree of the compressor control valve 26 to the value corresponding to the fully open state of the compressor control valve 26, and is configured such that exhaust gas flows bypassing the low pressure-stage turbine wheel 30 by setting the valve opening degree of the low pressure-stage turbine control valve 32 to the value corresponding to the fully open state of the low pressure-stage turbine control valve 32. On the other hand, the turbine control unit 37 determines whether the valve opening degree of the high pressure-stage turbine control valve 29 at this time should be set to the value corresponding to the fully closed of the high pressure-stage turbine control valve 29 or the value corresponding to the fully open state of the high pressure-stage turbine control valve 29, depending on which one of the first exhaust gas temperature Thc1 obtained by the exhaust gas temperature acquisition unit 36 and the second exhaust gas temperature Thc2 obtained by the exhaust gas temperature acquisition unit 36 is higher or lower than the other.

When the valve opening degree of the high pressure-stage turbine control valve 29 is set to the value corresponding to the fully closed state of the high pressure-stage turbine control valve 29, exhaust gas flows through the high pressure-stage turbine wheel 27, and the heat of exhaust gas is lost due to expansion work in passing through the high pressure-stage turbine wheel 27. In contrast, when the valve opening degree of the high pressure-stage turbine control valve 29 at this time is set to the value corresponding to the fully open state of the high pressure-stage turbine control valve 29, exhaust gas flows bypassing the high pressure-stage turbine wheel 27, and the heat of exhaust gas is not lost due to expansion work in passing through the high pressure-stage turbine wheel 27. Accordingly, the amount of heat that is lost from the discharge of exhaust gas from the combustion chambers 17 to the arrival of exhaust gas in the catalyst 22 is smaller when the valve opening degree of the high pressure-stage turbine control valve 29 is set to the value corresponding to the fully open state of the high pressure-stage turbine control valve 29 than when the valve opening degree of the high pressure-stage turbine control valve 29 is set to the value corresponding to the fully closed state of the high pressure-stage turbine control valve 29.

On the other hand, when the valve opening degree of the high pressure-stage turbine control valve 29 is set to the value corresponding to the fully closed state of the high pressure-stage turbine control valve 29, exhaust gas flows through the high pressure-stage turbine wheel 27 serving as a resistance against the flow of exhaust gas. Therefore, the pressure loss of exhaust gas passing through the high pressure-stage turbine 20 is larger than when the valve opening degree of the high pressure-stage turbine control valve 29 is set to the value corresponding to the fully open state of the high pressure-stage turbine control valve 29. In consequence, the back pressure of the supercharged engine (the in-manifold exhaust gas pressure Pem) is higher and the pump loss of the supercharged engine 10 is larger when the valve opening degree of the high pressure-stage turbine control valve 29 is set to the value corresponding to the fully closed state of the high pressure-stage turbine control valve 29 than when the valve opening degree of the high pressure-stage turbine control valve 29 is set to the value corresponding to the fully open state of the high pressure-stage turbine control valve 29.

In a case where nothing is done against the increase in pump loss at this time, the engine torque decreases. In the supercharged engine control system according to the present embodiment of the disclosure, when the pump loss increases, the torque control unit 35 increases the amounts of intake air and fuel to attempt to maintain a current engine torque. In consequence, the amount of thermal energy possessed by exhaust gas flowing into the exhaust passage 18 from the combustion chambers 17 of the respective cylinders is larger when the valve opening degree of the high pressure-stage turbine control valve 29 is set to the value corresponding to the fully closed state of the high pressure-stage turbine control valve 29 than when the valve opening degree of the high pressure-stage turbine control valve 29 is set to the value corresponding to the fully open state of the high pressure-stage turbine control valve 29.

In a case where the amount of thermal energy of exhaust gas that has just been discharged from the combustion chambers 17 remains the same, the amount of heat lost by exhaust gas passing through the high pressure-stage turbine 20 is smaller and the catalyst inflow exhaust gas temperature is hence higher when the valve opening degree of the high pressure-stage turbine control valve 29 is set to the value corresponding to the fully open state of the high pressure-stage turbine control valve 29 than when the valve opening degree of the high pressure-stage turbine control valve 29 is set to the value corresponding to the fully closed state of the high pressure-stage turbine control valve 29. It should be noted, however, that the amount of thermal energy of exhaust gas that has just been discharged from the combustion chambers 17 is larger when the valve opening degree of the high pressure-stage turbine control valve 29 is set to the value corresponding to the fully closed state of the high pressure-stage turbine control valve 29 than when the valve opening degree of the high pressure-stage turbine control valve 29 is set to the value corresponding to the fully open state of the high pressure-stage turbine control valve 29. Therefore, in a certain operating condition of the supercharged engine 10, the catalyst inflow exhaust gas temperature may become higher when the valve opening degree of the high pressure-stage turbine control valve 29 is set to the value corresponding to the fully closed state of the high pressure-stage turbine control valve 29 than when the valve opening degree of the high pressure-stage turbine control valve 29 is set to the value corresponding to the fully open state of the high pressure-stage turbine control valve 29.

In this respect, in the present embodiment of the disclosure, the exhaust gas temperature acquisition unit 36 obtains estimated values of the catalyst inflow exhaust gas temperature both in the case where the valve opening degree of the high pressure-stage turbine control valve 29 is set to the value corresponding to the fully closed state of the high pressure-stage turbine control valve 29 and in the case where the valve opening degree of the high pressure-stage turbine control valve 29 is set to the value corresponding to the fully open state of the high pressure-stage turbine control valve 29, as the first exhaust gas temperature Thc1 and the second exhaust gas temperature Thc2 respectively. Then, while there is a demand to heat up the catalyst 22, the turbine control unit 37 controls the high pressure-stage turbine control valve 29 such that the valve opening degree of the high pressure-stage turbine control valve 29 is set to the value corresponding to the fully closed state of the high pressure-stage turbine control valve 29 when the first exhaust gas temperature Thc1 is higher than the second exhaust gas temperature Thc2, and that the valve opening degree of the high pressure-stage turbine control valve 29 is set to the value corresponding to the fully open state of the high pressure-stage turbine control valve 29 when the second exhaust gas temperature Thc2 is higher than the first exhaust gas temperature Thc1. Therefore, where there is a demand to heat up the catalyst 22, the temperature of exhaust gas flowing into the exhaust catalyst 22 can be further raised. As a result, the catalyst 22 can be more swiftly heated up, and the shortening of the time required for regeneration of the filtering function and more reliable removal of PM can be realized.

Incidentally, in the present embodiment of the disclosure, when the first exhaust gas temperature Thc1 and the second exhaust gas temperature Thc2 are equal to each other, the valve opening degree of the high pressure-stage turbine control valve 29 is set to the value corresponding to the fully open state of the high pressure-stage turbine control valve 29. However, in this case, the catalyst inflow exhaust gas temperature remains the same regardless of whether the valve opening degree of the high pressure-stage turbine control valve 29 is set to the value corresponding to the fully closed state of the high pressure-stage turbine control valve 29 or the value corresponding to the fully open state of the high pressure-stage turbine control valve 29. Therefore, the valve opening degree of the high pressure-stage turbine control valve 29 in this case may be set to the value corresponding to the fully closed state of the high pressure-stage turbine control valve 29.

Incidentally, in the present embodiment of the disclosure, when the catalyst heat-up condition is fulfilled, the valve opening degrees of the compressor control valve 26 and the low pressure-stage turbine control valve 32 are set to the values corresponding to the fully open states of the compressor control valve 26 and the low pressure-stage turbine control valve 32 that allow intake air and exhaust gas to flow bypassing the high pressure-stage compressor wheel 24 and the low pressure-stage turbine wheel 30 respectively, so the pump loss is restrained from increasing unnecessarily. Besides, this also keeps the catalyst inflow exhaust gas temperature from falling due to expansion work in passing through the low pressure-stage turbine wheel 30.

Incidentally, the exhaust gas temperature acquisition unit 36 obtains the first exhaust gas temperature Thc1 and the second exhaust gas temperature Thc2 on the premise that a current engine torque is maintained. Therefore, when the engine torque changes as the pump loss changes as a result of changes in the valve opening degree of the high pressure-stage turbine control valve 29, the valve opening degree of the high pressure-stage turbine control valve 29 that is controlled by the turbine control unit 37 may not become equal to the valve opening degree at which the catalyst inflow exhaust gas temperature is higher, depending on what happens afterward. In contrast, however, the supercharged engine control system according to the aforementioned embodiment of the disclosure includes the torque control unit 35 that performs the control of the supercharged engine 10 such that an engine torque corresponding to the required torque set in accordance with the accelerator pedal operation amount ACC is ensured. Then, the torque control unit 35 attempts to maintain a current engine torque even when the valve opening degree of the high pressure-stage turbine control valve 29 is changed. Therefore, the catalyst inflow exhaust gas temperature is more reliably raised.

Incidentally, in the present embodiment of the disclosure, the high pressure-stage turbine control valve 29 is a turbine control valve whose valve opening degree is controlled by the turbine control unit 37 depending on which one of the first exhaust gas temperature Thc1 and the second exhaust gas temperature Thc2 is higher or lower than the other. Besides, the fully closed state of the high pressure-stage turbine control valve 29 blocks the flow of exhaust gas through the bypass passage 28, and the pressure loss of exhaust gas passing through the turbine (the high pressure-stage turbine 20) corresponds to the first valve opening degree that is larger than the second valve opening degree. Furthermore, the fully open state of the high pressure-stage turbine control valve 29 permits the flow of exhaust gas through the bypass passage 28, and the pressure loss of exhaust gas passing through the turbine (the high pressure-stage turbine 20) corresponds to the second valve opening degree that is smaller than the first valve opening degree.

The aforementioned embodiment of the disclosure can also be carried out after being altered as follows. For example, the valve opening degree or valve opening degrees of one or both of the compressor control valve 26 and the low pressure-stage turbine control valve 32 may be controlled in accordance with the first exhaust gas temperature Thc1 and the second exhaust gas temperature Thc2, as is the case with the high pressure-stage turbine control valve 29.

Besides, in the case where the high pressure-stage turbine 20 is not provided with the high pressure-stage turbine control valve 29 or the like, the valve opening degree of the low pressure-stage turbine control valve 32 may be controlled in accordance with the first exhaust gas temperature Thc1 and the second exhaust gas temperature Thc2. In this case, the exhaust gas temperature acquisition unit 36 obtains, as the first exhaust gas temperature Thc1, a catalyst inflow exhaust gas temperature in the case where the valve opening degree of the low pressure-stage turbine control valve 32 is set to the value corresponding to the fully closed state of the low pressure-stage turbine control valve 32 while maintaining a current engine torque, and obtains, as the second exhaust gas temperature Thc2, a catalyst inflow exhaust gas temperature in the case where the valve opening degree of the low pressure-stage turbine control valve 32 is set to the value corresponding to the fully open state of the low pressure-stage turbine control valve 32 while maintaining a current engine torque.

In the turbine control unit 37 in the aforementioned embodiment of the disclosure, the catalyst heat-up condition is set in such a manner as to be fulfilled in carrying out regeneration of the filtering function of the catalyst 22. However, the catalyst heat-up condition may be set in such a manner as to be fulfilled when the heat-up of the catalyst 22 is demanded for other reasons such as early activation of the catalyst 22 and the like. For example, when the supercharged engine 10 is operated at low load and at low rotational speed, the temperature of exhaust gas is low, and the flow rate of exhaust gas is small, so the bed temperature of the catalyst 22 tends to be low. In consequence, the catalyst heat-up condition is set in such a manner as to be fulfilled when the supercharged engine 10 is operated at low load and at low rotational speed for a certain time or more, and catalyst heat-up turbine control as described above is performed. Thus, the temperature of the catalyst 22 can be restrained from falling.

The supercharged engine control system according to the aforementioned embodiment of the disclosure is applied to the supercharged engine 10 in which two turbines, namely, the high pressure-stage turbine 20 and the low pressure-stage turbine 21 are arranged in series in the exhaust passage 18. Turbine control performed by the supercharged engine control system according to the aforementioned embodiment of the disclosure is also applicable to any supercharged engine in which turbines are arranged in other patterns.

Figure 9:
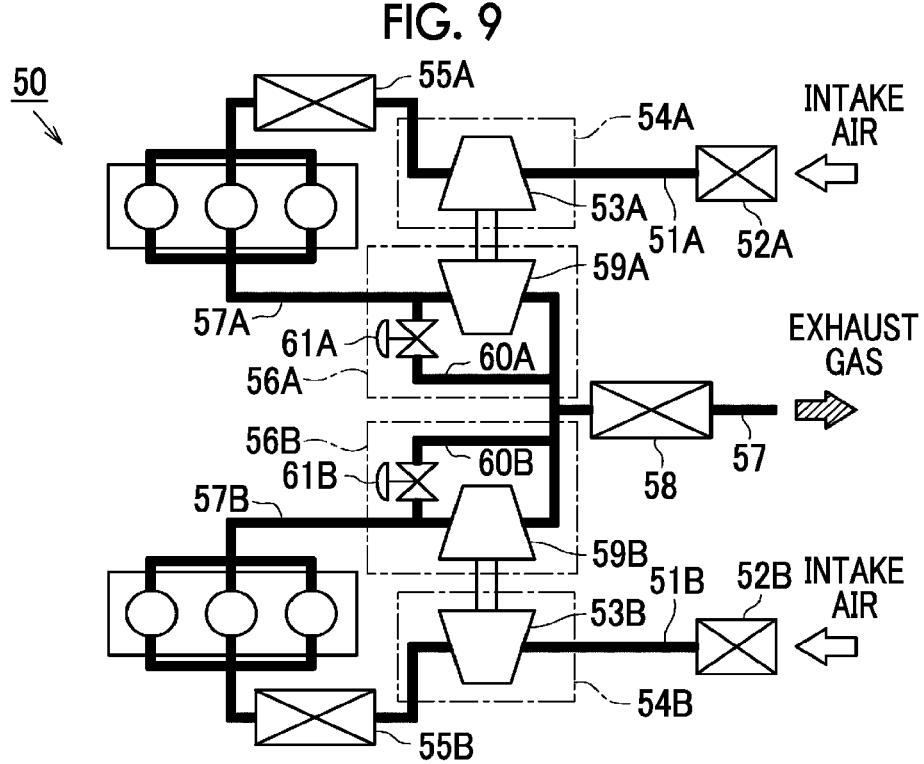
FIG. 9 is a view schematically showing the configuration of an intake/exhaust system of a supercharged engine that includes two turbines arranged in parallel with each other.

For example, a supercharged engine 50 shown in FIG. 9 has a V-shaped cylinder arrangement having cylinders arranged on two separate banks, that is, a first bank and a second bank, and is configured such that the two banks include turbines respectively. This supercharged engine 50 includes an intake passage 51A and an intake passage 51B separately for the banks. The intake passages 51A and 51B are provided with compressors 54A and 54B and intercoolers 55A and 55B respectively. The compressors 54A and 54B and the intercoolers 55A and 55B include air cleaners 52A and 52B and compressor wheels 53A and 53B respectively. Besides, the supercharged engine 50 includes exhaust passages 57A and 57B separately for the banks. Turbines 56A and 56B are installed in the exhaust passages 57A and 57B respectively. The two exhaust passages 57A and 57B merge downstream of the turbines 56A and 56B respectively. A catalyst 58 is provided in an exhaust passage 57 into which the exhaust passages 57A and 57B merge. Furthermore, the turbines 56A and 56B include turbine wheels 59A and 59B that are coupled to the compressor wheels 53A and 53B respectively, and bypass passages 60A and 60B that are configured such that exhaust gas flows bypassing the turbine wheels 59A and 59B respectively. Besides, the turbines 56A and 56B include turbine control valves 61A and 61B that block the flow of exhaust gas through the bypass passages 60A and 60B by setting the valve opening degrees of the turbine control valves 61A and 61B to values corresponding to fully closed states of the turbine control valves 61A and 61B, and that permit the flow of exhaust gas through the bypass passages 60A and 60B by setting the valve opening degrees of the turbine control valves 61A and 61B to values corresponding to fully open states of the turbine control valves 61A and 61B, respectively.

In this supercharged engine 50 as well, the catalyst inflow exhaust gas temperature upon a demand to heat up the catalyst can be further raised, by providing the exhaust gas temperature acquisition unit 36 and the turbine control unit 37 that are similar to those of the aforementioned embodiment of the disclosure. In this case, the exhaust gas temperature acquisition unit 36 obtains, as the first exhaust gas temperature Thc1, an estimated value of the catalyst inflow exhaust gas temperature in the case where the valve opening degrees of the turbine control valves 61A and 61B are set to the values corresponding to the fully closed states of the turbine control valves 61A and 61B while maintaining a current engine torque. Besides, the exhaust gas temperature acquisition unit 36 obtains, as the second exhaust gas temperature Thc2, an estimated value of the catalyst inflow exhaust gas temperature in the case where the valve opening degrees of the turbine control valves 61A and 61B are set to the values corresponding to the fully open states of the turbine control valves 61A and 61B while maintaining a current engine torque. Then in this case, the turbine control unit 37 controls the two turbine control valves 61A and 61B in such a manner as to set the valve opening degrees of the turbine control valves 61A and 61B to the values corresponding to the fully closed states of the turbine control valves 61A and 61B when the first exhaust gas temperature Thc1 is higher than the second exhaust gas temperature Thc2, and to set the valve opening degrees of the turbine control valves 61A and 61B to the values corresponding to the fully open states of the turbine control valves 61A and 61B when the second exhaust gas temperature Thc2 is higher than the first exhaust gas temperature Thc1, respectively.

Figure 10:
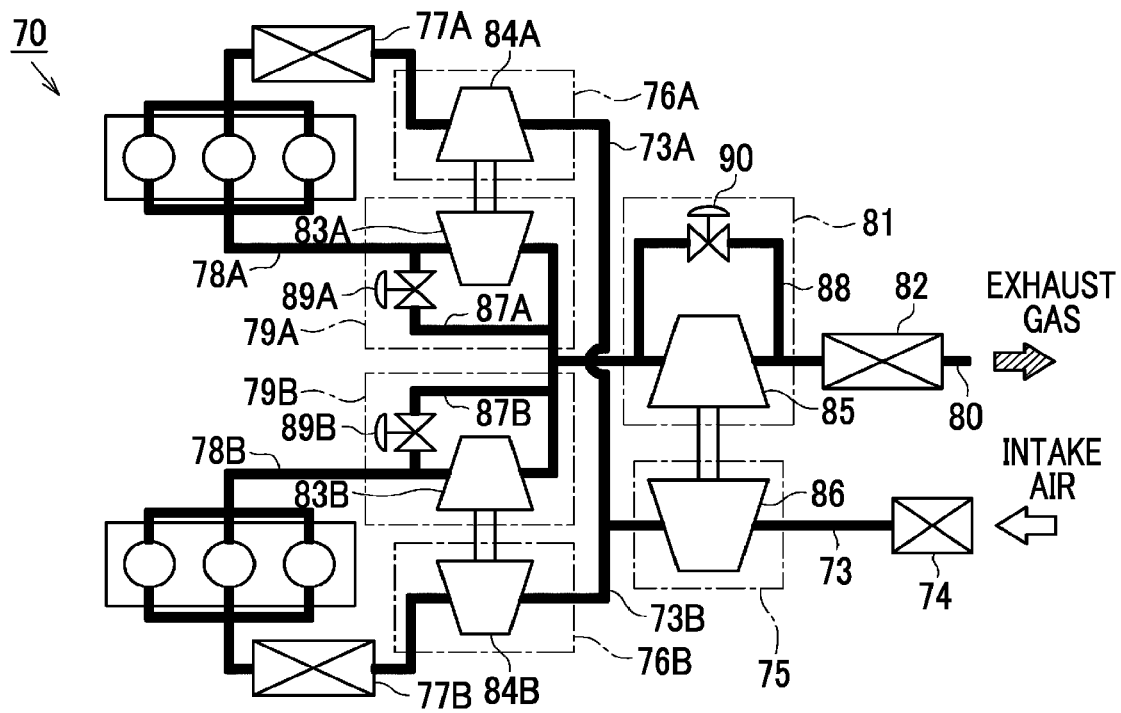
FIG. 10 is a view schematically showing the configuration of an intake/exhaust system of a supercharged engine that includes three turbines.

Furthermore, turbine control according to the aforementioned embodiment of the disclosure is also applicable to a supercharged engine 70 that includes three turbines (79A, 79B and 81 as shown in FIG. 10. The supercharged engine 70 shown in FIG. 10 also has a V-shaped cylinder arrangement having cylinders arranged on two separate banks, that is, a first bank and a second bank. An air cleaner 74 and a low pressure-stage compressor 75 are installed in an intake passage 73 of this supercharged engine 70. Besides, the intake passage 73 branches off separately for the banks downstream of the low pressure-stage compressor 75. Intake passages 73A and 73B into which the intake passage 73 branches off are provided with high pressure-stage compressors 76A and 76B and intercoolers 77A and 77B respectively. On the other hand, the supercharged engine 70 includes exhaust passages 78A and 78B separately for the banks. The exhaust passages 78A and 78B are provided with high pressure-stage turbines 79A and 79B respectively. Both the exhaust passages 78A and 78B merge downstream of high pressure-stage turbines 79A and 79B respectively. An exhaust passage 80 into which the exhaust passages 78A and 78B merge is provided with a low pressure-stage turbine 81 and a catalyst 82.

Turbine wheels 83A and 83B of the high pressure-stage turbines 79A and 79B are coupled to compressor wheels 84A and 84B of the high pressure-stage compressors 76A and 76B respectively. A turbine wheel 85 of the low pressure-stage turbine 81 is coupled to a compressor wheel 86 of the low pressure-stage compressor 75. Besides, the high pressure-stage turbines 79A and 79B and the low pressure-stage turbine 81 include bypass passages 87A, 87B and 88 that allows exhaust gas to flow bypassing the turbine wheels 83A, 83B and 85, respectively. Furthermore, the high pressure-stage turbines 79A and 79B and the low pressure-stage turbine 81 include turbine control valves 89A, 89B and 90 that block the flow of exhaust gas through the bypass passages 87A, 87B and 88 by setting the valve opening degrees of the turbine control valves 89A, 89B and 90 to values corresponding to fully closed states of the turbine control valves 89A, 89B and 90, and that permit the flow of exhaust gas through the bypass passages 87A, 87B and 88 by setting the valve opening degrees of the turbine control valves 89A, 89B and 90 to values corresponding to fully open states of the turbine control valves 89A, 89B and 90, respectively.

In the case of this supercharged engine 70, the catalyst inflow exhaust gas temperature can be further raised by configuring the exhaust gas temperature acquisition unit 36 and the turbine control unit 37, for example, as follows. That is, the exhaust gas temperature acquisition unit 36 obtains, as the first exhaust gas temperature Thc1, an estimated value of the catalyst inflow exhaust gas temperature in the case where the valve opening degrees of the turbine control valves 89A and 89B are set to the values corresponding to the fully closed states of the turbine control valves 89A and 89B while maintaining a current engine torque. Besides, the exhaust gas temperature acquisition unit 36 obtains, as the second exhaust gas temperature Thc2, an estimated value of the catalyst inflow exhaust gas temperature in the case where the valve opening degrees of the turbine control valves 89A and 89B are set to the values corresponding to the fully open states of the turbine control valves 89A and 89B while maintaining a current engine torque. Then, when the first exhaust gas temperature Thc1 is higher than the second exhaust gas temperature Thc2, the turbine control unit 37 sets the valve opening degrees of the turbine control valves 89A and 89B to the values corresponding to the fully closed states of the turbine control valves 89A and 89B to block the flow of exhaust through the bypass passages 87A and 87B, respectively. Furthermore, when the second exhaust gas temperature Thc2 is higher than the first exhaust gas temperature Thc1, the turbine control unit 37 sets the valve opening degrees of the turbine control valves 89A and 89B to the values corresponding to the fully open states of the turbine control valves 89A and 89B to permit the flow of exhaust gas through the bypass passages 87A and 87B, respectively.

Furthermore, turbine control according to the aforementioned embodiment of the disclosure is also applicable to a supercharged engine that includes one or four or more turbines. In this case as well, the catalyst inflow exhaust gas temperature can be further raised.

Figure 11:
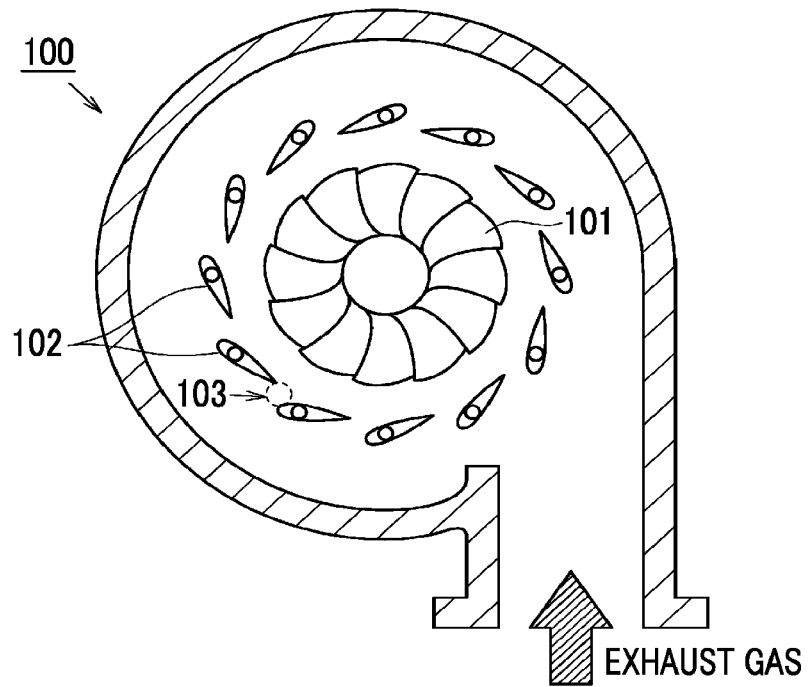
FIG. 11 is a view schematically showing the cross-sectional structure of a variable nozzle-type turbine with the opening area of a blowing port reduced.
Figure 12:
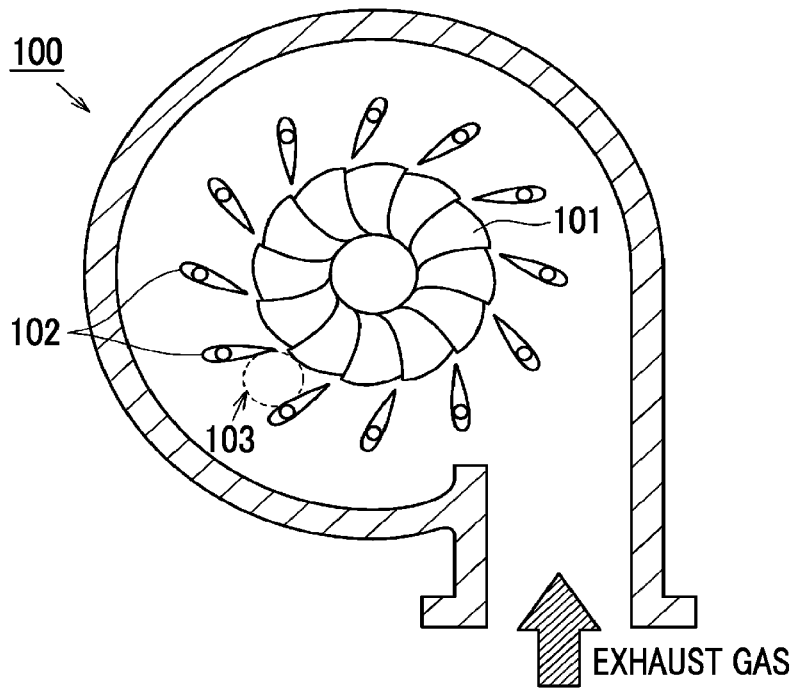
FIG. 12 is a view schematically showing the cross-sectional structure of the variable nozzle-type turbine with the opening area of the blowing port increased.

The catalyst inflow exhaust gas temperature can be further raised by applying turbine control according to the aforementioned embodiment of the disclosure also to a supercharged engine that includes a variable nozzle-type turbine 100 as shown in FIGS. 11 and 12. The variable nozzle-type turbine 100 includes a plurality of movable nozzle vanes 102 that are provided in such a manner as to surround a turbine wheel 101. In this variable nozzle-type turbine 100, blowing ports 103 for blowing exhaust gas on the turbine wheel 101 are formed among the nozzle vanes 102 that are adjacent to each other, respectively. The opening areas of the blowing ports 103 can be made variable by changing the angles of the nozzle vanes 102 respectively. Incidentally, FIG. 11 shows a state where the nozzle vanes 102 are driven in such a manner as to reduce the opening areas of the blowing ports 103 respectively. FIG. 12 shows a state where the nozzle vanes 102 are driven in such a manner as to increase the opening areas of the blowing ports 103 respectively.

In this variable nozzle-type turbine 100, when the nozzle vanes 102 are driven in such a manner as to increase the opening areas of the blowing ports 103 respectively, the pressure loss of exhaust gas passing through the turbine 100 becomes small. Then, as a result, the amount of heat lost by exhaust gas due to expansion work in passing through the turbine 100 becomes small. On the other hand, when the nozzle vanes 102 are driven in such a manner as to reduce the opening areas of the blowing ports 103 respectively, the pressure loss of exhaust gas passing through the turbine 100 becomes large. As a result, the amount of heat lost by exhaust gas due to expansion work in passing through the turbine 100 becomes large. It should be noted, however, that when the opening areas of the blowing ports 103 are reduced, the back pressure of the supercharged engine becomes high and the pump loss increases, so the engine torque decreases. Therefore, in the case where the supercharged engine is operated in such a manner as to maintain an engine torque, the temperature of exhaust gas that has just been discharged from the combustion chambers is higher when the opening areas of the blowing ports 103 are reduced than when the opening areas of the blowing ports 103 are increased. Even when the amount of fall in the temperature of exhaust gas passing through the turbine 100 is large, the catalyst inflow exhaust gas temperature may become high.

Accordingly, when turbine control according to the aforementioned embodiment of the disclosure is performed using the nozzle vanes 102 of this variable nozzle-type turbine 100 as turbine control valves, the nozzle vanes 102 can be controlled such that the catalyst inflow exhaust gas temperature becomes higher. In this case, the opening area of each of the blowing ports 103 is smaller when a corresponding one of the nozzle vanes 102 is at the first valve opening degree than when the corresponding one of the nozzle vanes 102 is at the second valve opening degree.

Furthermore, each of the embodiments of the disclosure described above can also be carried out after being altered as follows. In each of the aforementioned embodiments of the disclosure, both the first exhaust gas temperature Thc1 and the second exhaust gas temperature Thc2 are obtained through estimation. However, in the case where a sensor for measuring the catalyst inflow exhaust gas temperature is installed, one of the first exhaust gas temperature Thc1 and the second exhaust gas temperature Thc2 may be obtained through actual measurement. That is, when the valve opening degree of the high pressure-stage turbine control valve 29 is set to the value corresponding to the fully closed state of the high pressure-stage turbine control valve 29, the first exhaust gas temperature Thc1 can be obtained through actual measurement. When the valve opening degree of the high pressure-stage turbine control valve 29 is set to the value corresponding to the fully open state of the high pressure-stage turbine control valve 29, the second exhaust gas temperature Thc2 can be obtained through actual measurement.

Besides, in the case where the control of the supercharged engine 10 is performed in such a manner as to hold the engine rotational speed equal to a target rotational speed as is the case with, for example, an idle speed control (ISC) system as well, the engine torque can be maintained when the pump loss changes as the valve opening degree of the turbine control valve changes. Therefore, in a case where catalyst heat-up turbine control is performed when the ISC system controls the rotational speed of the supercharged engine 10, the catalyst inflow exhaust gas temperature can be more reliably raised. A control system that performs the control of the engine 10 to maintain a current engine torque when the pump loss changes, such as this ISC system or the like, can replace the torque control unit 35 according to each of the aforementioned embodiments of the disclosure. Incidentally, even in the case where this torque control unit is dispensed with, when an unintended decrease in engine torque is caused by an increase in pump loss, a driver often performs an operation of further depressing the accelerator pedal to increase the engine torque, with a view to recovering the decrease in engine torque. Therefore, turbine control according to each of the aforementioned embodiments of the disclosure is useful in raising the catalyst inflow exhaust gas temperature, even in the case where a torque control unit that controls the supercharged engine 10 in such a manner as to maintain a current engine torque when the pump loss changes is not provided.

What is claimed is:
1. A supercharged engine comprising:
   a combustion chamber;
   an intake passage connected to the combustion chamber through which air is supplied to the combustion chamber;
   an exhaust passage connected to the combustion chamber to discharge exhaust gas from the combustion chamber;
   a turbocharger including a compressor positioned in the intake passage and a turbine positioned in the exhaust passage, the turbine including
      a turbine wheel rotated by the exhaust gas,
      a turbine bypass passage for the exhaust gas bypassing the turbine wheel, and a turbine control valve regulates the exhaust gas that is blown on the turbine wheel in accordance with a change in a valve opening degree,
    wherein the valve opening degree of the turbine control valve includes a first valve opening degree and a second valve opening degree, and
    wherein a pressure loss of the exhaust gas passing through the turbine is smaller when the turbine control valve is set to the second valve opening degree than when the turbine control valve is set to the first valve opening degree;
an exhaust catalyst being provided downstream of the turbine in the exhaust passage; and
an electronic control unit,
    wherein the electronic control unit is configured to calculate a first exhaust gas temperature which is a catalyst inflow exhaust gas temperature, being detected by a temperature sensor, when the valve opening degree of the turbine control valve is set to the first valve opening degree while maintaining an engine torque,
    wherein the electronic control unit is configured to calculate a second exhaust gas temperature which is the catalyst inflow exhaust gas temperature, being detected by the temperature sensor, when the valve opening degree of the turbine control valve is set to the second valve opening degree while maintaining an engine torque,
    wherein the electronic control unit is configured to control the turbine control valve to the first valve opening degree when the first exhaust gas temperature is higher than the second exhaust gas temperature,
    wherein the electronic control unit is configured to control the turbine control valve to the second valve opening degree when the second exhaust gas temperature is higher than the first exhaust gas temperature, and
    wherein the electronic control unit is configured to control intake air and fuel supplied to the supercharged engine;
        wherein the intake air and fuel, during the turbine control valve being in the first valve opening degree, is higher than the turbine control valve being in the second valve opening degree to maintain the engine torque while a change in a pump loss of the supercharged engine occurs.

2. The supercharged engine according to claim 1, wherein
    the first valve opening degree of the turbine control valve is a valve opening degree at which the turbine control valve blocks flow of exhaust gas through the bypass passage, and
    the second valve opening degree of the turbine control valve is a valve opening degree at which exhaust gas flows through the bypass passage.

3. The supercharged engine according to claim 1, wherein
    the turbine control valve is configured to change an opening area of a blowing port of exhaust gas blown on the turbine wheel, and
    the opening area at the first valve opening degree is smaller than the opening area at the second valve opening degree.

4. The supercharged engine according to claim 1, wherein the electronic control unit is configured to control the supercharged engine to set the engine torque corresponding to a required torque in accordance with an operation amount of an accelerator pedal.

5. The supercharged engine according to claim 1, wherein the electronic control unit is configured to control of the valve opening degree of the turbine control valve based on the first exhaust gas temperature and the second exhaust gas temperature when the exhaust catalyst is in a predetermined condition.

6. The supercharged engine according to claim 5, wherein
    the exhaust catalyst is configured to collect particulate matters in exhaust gas as a filtering function, and
    the exhaust catalyst is in the predetermined condition when the particulate matters collected by the exhaust catalyst is greater than a predetermined value.

7. The supercharged engine according to claim 1, wherein the electronic control unit is further configured to calculate the first exhaust temperature based on at least one map of a first fuel flow rate and a first air-fuel ratio, and the second exhaust temperature based on the at least one map of a second fuel flow rate and a second air-fuel ratio.

* * * * *